O. F. FULLER.
FARM GATE.

No. 189,620. Patented April 17, 1877.

WITNESSES:
Francis McArdle
J. A. Scarborough

INVENTOR:
O. F. Fuller
BY
Munn & Co.
ATTORNEYS.

UNITED STATES PATENT OFFICE.

ORLANDO F. FULLER, OF LAMONT, MICHIGAN.

IMPROVEMENT IN FARM-GATES.

Specification forming part of Letters Patent No. 189,620, dated April 17, 1877; application filed January 13, 1877.

*To all whom it may concern:*

Figure 1:
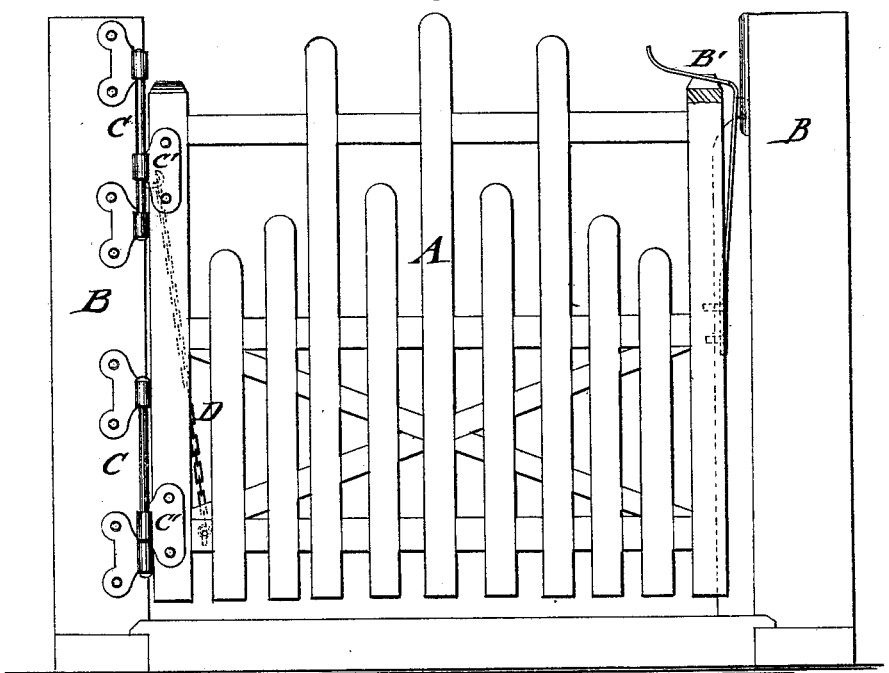
Figure 2:
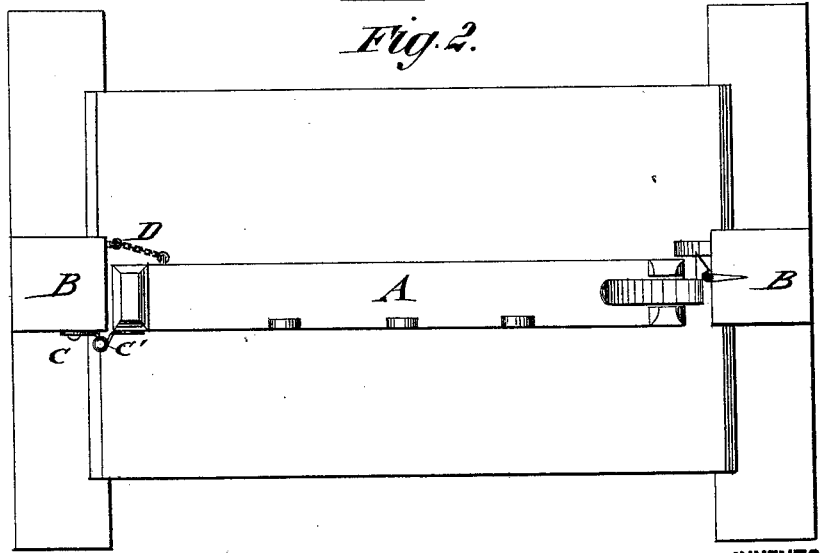

Be it known that I, ORLANDO F. FULLER, of Lamont, in the county of Ottawa and State of Michigan, have invented a new and Improved Farm-Gate, of which the following is a specification:

In the accompanying drawing, Figure 1 represents a front elevation of my improved farm-gate, and Fig. 2 a top view of the same.

Similar letters of reference indicate corresponding parts.

The invention relates to an improved farm-gate that may be conveniently adjusted at suitable distance above the ground, to clear the snow in winter, and admit the passage of smaller animals—as hogs or sheep—being also self-closing by its own weight as soon as released.

The invention consists of a gate that is hung to hinge-rods of the post, and adjusted on the same to different height by a chain which connects the gate with the gate-post, and closes, by the stretching of the chain, the gate in automatical manner.

In the drawing, A represents a gate of suitable size and construction, which is hung by sleeves C' to pintle-rods C of one gate-post, B, being locked by a spring-latch, B', to the opposite post B. The pintle-rods C are perforated in length to the greatest height to which the gate is desired to be lifted above ground, according to the depth of the snow or the size of the animals that are intended to pass below the same. The rods C are secured to the gate-post B by end supports or sockets, which hold them rigidly in position thereon. A chain, D, with some links of larger size is attached to the lower part of the gate and to a hook-shaped support of the gate-post placed above the point of connection with the gate. The larger links of the chain admit the hanging of the gate at different heights on the pintle-rods C, as required. The chain exerts, furthermore, a stretching influence, so as to raise the gates, on opening, on the rods C, and close the same by the strain and the weight of the gate, automatically, as soon as released. The gate swings thereby into closed position and is locked by the spring-latch. The projection or rib on which the spring-latch locks is of corresponding length with the height to which the gate may be lifted, so as to produce the locking of the same to whatever height the gate is hinged. The links of the gate-chain admit the ready adjustment of the gate to greater or less height, forming thereby a convenient and useful gate for farmers in winter and for other purposes.

When it is desired to have the gate swing both ways, the hinges are arranged in the middle of the post with a chain attached to each side of the gate, and a double catch on the spring-latch.

Having thus described my invention, I claim as new and desire to secure by Letters Patent—

The combination, with the gate and posts A B, rods C, rigidly secured in sockets C, and the sleeves C', of the chain D fastened at one end near the bottom of gate, and at the other to a superposed hook on gate-post, as shown and described, to enable the gate to be readily adjusted to hang at different heights.

ORLANDO F. FULLER.

Witnesses:
BETHUEL RICE,
WM. D. SWETT.